United States Patent [19]

McElroy

[11] 3,898,840
[45] Aug. 12, 1975

[54] MULTI-FREQUENCY ULTRASONIC SEARCH UNIT

[75] Inventor: Jerry T. McElroy, Danbury, Conn.

[73] Assignee: Automation Industries, Inc., Los Angeles, Calif.

[22] Filed: Jan. 30, 1974

[21] Appl. No.: 437,793

[52] U.S. Cl. .............. 73/67.9; 73/71.5 US; 310/8.7
[51] Int. Cl.² ......................................... G01N 29/04
[58] Field of Search ............. 73/67.5 R, 67.6, 67.7, 73/67.8 R, 67.8 S, 67.9, 71.5 US; 310/8.1, 8.2, 9.4, 9, 8.3, 8.7

[56] References Cited
UNITED STATES PATENTS

| | | | |
|---|---|---|---|
| 2,565,725 | 8/1951 | Frederick et al. | 73/67.9 |
| 3,014,364 | 12/1961 | Crooks | 73/67.8 R X |
| 3,292,018 | 12/1966 | Clynes | 73/67.8 R X |
| 3,309,914 | 3/1967 | Weighart | 73/67.9 |
| 3,379,051 | 4/1968 | Zeutschel et al. | 73/67.9 |
| 3,485,087 | 12/1969 | Brech | 73/67.9 X |
| 3,573,515 | 4/1971 | Stombaugh | 73/71.5 US X |
| 3,616,682 | 11/1971 | Golis | 73/71.5 US X |
| 3,663,842 | 5/1972 | Miller | 73/67.9 X |

Primary Examiner—Richard C. Queisser
Assistant Examiner—Stephen A. Kreitman
Attorney, Agent, or Firm—Dan R. Sadler

[57] ABSTRACT

A multi-frequency ultrasonic nondestructive testing system and a multi-frequency search unit for use in such a system are disclosed herein. The search unit includes a plurality of piezoelectric transducers for transmitting and receiving ultrasonic energy at a corresponding number of different frequencies. One transducer is adapted to transmit and/or receive relatively high frequency ultrasonic energy for resolving discontinuities on or near the surface of a workpiece while another transducer is provided to transmit and/or receive relatively low frequency ultrasonic energy for resolving discontinuities buried deep within the workpiece material.

11 Claims, 5 Drawing Figures

MULTI-FREQUENCY ULTRASONIC SEARCH UNIT

BACKGROUND

One form of nondestructive testing employs ultrasonic energy. A search unit is provided for transmitting ultrasonic energy into a workpiece and producing electrical signals corresponding to ultrasonic energy reflected back to the search unit from the surfaces or interior of the workpiece.

In a so-called pulse-echo system the search unit is adapted to transmit bursts or pulses of ultrasonic energy in response to a repetitively occurring driving signal. The pulses of ultrasonic energy are transmitted into the workpiece and reflected back to the search unit from any discontinuities. The surfaces of the workpiece and any defects such as cracks, voids, inclusions, etc., present inside the workpiece material constitute detectable discontinuities. The search unit in response to the reflected energy generates electrical signals corresponding thereto. By measuring the amplitude and time delay of the resultant echo or reflected signals, it is possible to determine the size and position of the discontinuity.

In order to obtain an accurate measurement of the size, position, etc., of a discontinuity, it is necessary to accurately measure the amplitude and time, etc., of the electrical signal generated by the search unit. To accurately resolve defects from these electrical signals, particularly those defects which are small and/or close to the front surface of the workpiece, it is desirable to utilize a relatively high frequency. Unfortunately high frequency ultrasonic energy is highly attenuated by some materials such as stainless steel, Inconel, Monel, Rene, etc. As a result, in order to accurately locate and measure defects close to the surface and those buried at substantial depths within a workpiece, it is necessary to employ different frequencies depending on the depth.

Heretofore, in order to make a multi-frequency inspection of a workpiece, it has been customary to perform at least two separate and distinct tests at the two different frequencies. This redundant testing is, of course, time consuming and expensive.

More recently it has been proposed to utilize a system which can simultaneously inspect the workpiece with two different frequencies. Such a system is disclosed and claimed in a copending application Ser. No. 409,078 filed Oct. 24, 1973, in the names of Jerry T. McElroy and Sidney Soloway, entitled "MULTI-FREQUENCY ULTRASONIC TESTING SYSTEM" and assigned of record to Automation Industries, Inc.

Ultrasonic search units for use in conventional systems employ piezoelectric crystals. Such crystals are characteristically sensitive to frequency and are not capable of operating with optimum performance at more than one frequency. As a consequence, known search units available for single frequency testing systems have not been capable of operating satisfactorily at the diverse frequencies contemplated by the aforementioned multi-frequency testing system.

SUMMARY

The present invention provides means for overcoming the foregoing difficulties. More particularly, the present invention includes a search unit capable of operating at more than one frequency with a high degree of resolution and accuracy at each of the employed frequencies. In the limited number of embodiments disclosed herein this is accomplished by providing a search unit having at least two separate and distinct piezoelectric crystals. Each crystal is capable of operating at a different frequency independently of the other. The acoustical beam patterns of the crystals overlap each other and are focused to different depths of the workpiece material. Reflected ultrasonic waves from the two frequencies are precisely electrically correlated with each other to present a single test display consisting of composites from each of the transducers.

DRAWINGS

DESCRIPTION

Figure 1:
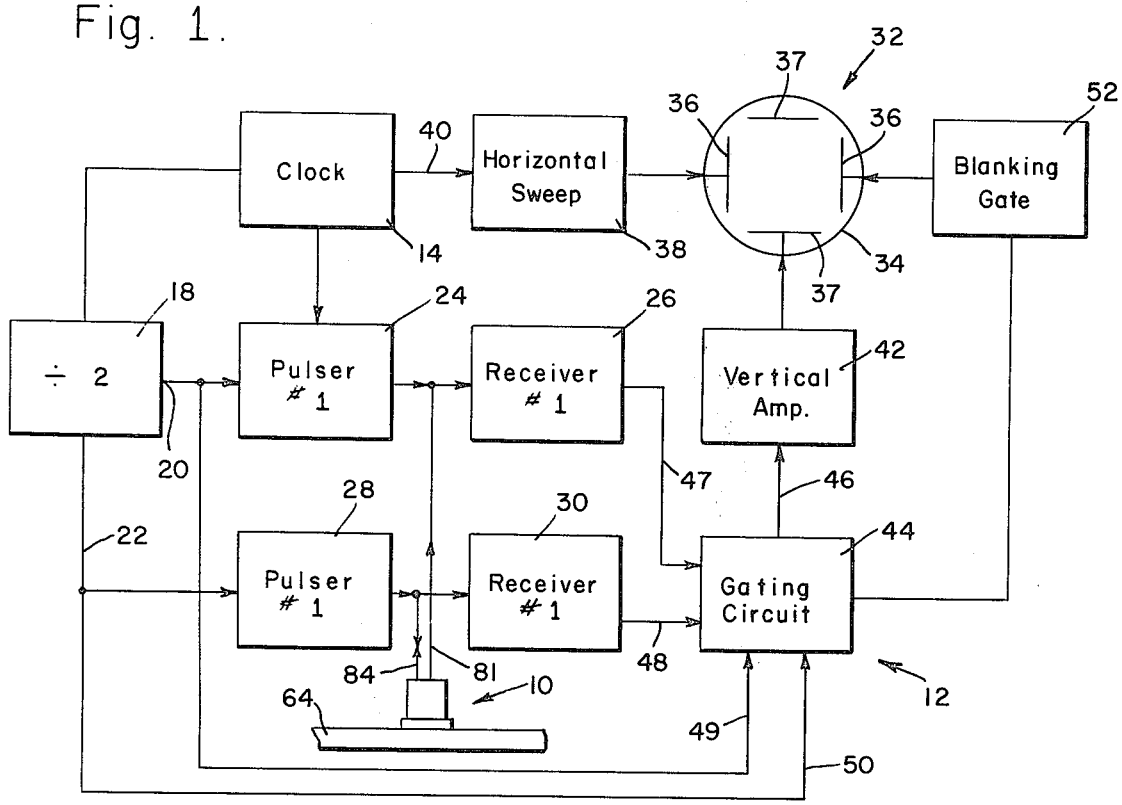
FIG. 1 is a block diagram of a nondestructive testing system employing a search unit embodying the present invention.

Referring to the drawings in more detail, the present invention is particularly adapted to be embodied in an ultrasonic search unit 10 for use in an ultrasonic nondestructive testing system 12. The search unit 10 may be employed in any type of ultrasonic nondestructive testing system 12 (i.e., a continuous wave, through transmission, pulse-echo, etc.). Moreover, the search unit 10 may function as just a transmitter or just a receiver. However, in the present instance it is shown functioning as a combination transmitter and receiver for use in a dual frequency ultrasonic nondestructive testing system similar to that disclosed and claimed in the above-referenced copending application Ser. No. 409,078.

With particular reference to FIG. 1, the ultrasonic testing system 12 is shown in block diagram form. This system is designed to operate in a pulse-echo mode and includes a pulse generator or electrical clock 14. Clock 14 produces a series of periodic timing or clock pulses effective to determine the repetition rate at which the entire system 12 operates. This repetition rate is not believed to be critical and may vary over a wide range. However, by way of example, it may be in the region of about 1 or 2 kilocycles per second.

One output of the clock 14 is coupled to a divided-by-two circuit 18. Circuit 18 may be of any desired construction. By way of example, it may be a flip-flop which reverses its state each time a clock pulse occurs at clock output. This will result in a first series of sync pulses occurring on a first output 20 and a second series of sync pulses occurring on a second output 22 of circuit 18. The pulses in these two series are synchronized with the clock pulses but occur at one-half the frequency thereof and are 180° out-of-phase with each other.

Output 20 of divider circuit 18 is coupled to the control input of a first channel pulser 24. The pulser is responsive to the first series of sync pulses whereby it will operate synchronously therewith. Each time a sync pulse from the first series occurs pulser 24 produces a pulse suitable for driving a search unit transducer. This is normally a high-voltage pulse of one or more cycles in the frequency range of 25 kilocycles to 25 megacycles or even higher.

The output of pulser 24 is coupled to search unit 10. Normally this is accomplished by means of a flexible, coaxial cable whereby the search unit 10 may be acoustically coupled to and moved around the surface of the workpiece.

Each time a driving pulse is applied to search unit 10, it causes a corresponding burst or pulse of ultrasonic energy to be transmitted from the transducer therein. This burst or pulse of ultrasonic energy which generally has the same frequency as the driving pulse is reflected back from any acoustical discontinuities on or in the workpiece. The search unit is responsive to these reflected ultrasonic echoes and produces a corresponding electrical signal.

This corresponding signal is sometimes referred to as an RF signal in that it is composed of radio frequency components substantially equal in frequency to the ultrasonic energy. The amplitude of the RF components of the signal are modulated according to the time and amplitude of the returning ultrasonic echoes.

A receiver 26 is connected to the coaxial cable from the search unit 10 to process the returning signals. More particularly, receiver 26 may detect the envelope of the modulated RF components and process the signal to provide only one side of the envelope at the receiver output. The resulting signal is commonly referred to as the video signal.

The second output 22 of the divider circuit 18 is coupled to the control input of a second channel 28 pulser. This second pulser is similar to pulser 24. However, it is responsive to the second series of sync pulses to transmit correspondingly timed driving pulses to the search unit.

As explained in more detail herein, the frequency of this driving pulse is also in a range of about 25 kilocycles to 25 megacycles, however the particular frequency of this second channel differs materially from the frequency of the transmitted pulse available from first channel pulser 24.

To process the return echoes resulting from these second channel pulses, a second channel receiver 30 is provided similar to receiver 26.

The outputs of the two receivers 26 and 30 are coupled to one or more suitable utilizing or indicating means. Although these may be any of a wide variety, in the present instance, by way of example, an oscilloscope 32 is shown. The oscilloscope includes a cathode ray tube 34 having horizontal deflection plates 36 and vertical deflection plates 37.

A horizontal sweep generator 38 is coupled to the second output 40 of the clock and to the horizontal deflection plates 36. As a consequence, each time a clock pulse occurs, the horizontal sweep generator causes the electron beam to be swept horizontally across the face of the cathode ray tube 34.

The outputs of the first and second channel receivers 26 and 30 are coupled to a vertical deflection amplifier 42 by means of a gating circuit 44. The amplifier 42 in turn is coupled to the vertical deflection plates 37 in the cathode ray tube 34.

Gating circuit 44 may be of a type having a single output 46 to which one or the other of a pair of signal inputs 47 and 48 are connected. The selective connection between the signal inputs and the output 46 is dictated by a pair of control inputs 49 and 50. The two control inputs 49 and 50 are coupled to the outputs of the divider circuit 18.

The first and second series sync pulses from the divider circuit 18 are effective to alternately "OPEN" and "CLOSE" the two different channels of the gate in synchronism with the operation of the first pulser 24 and associated receiver 26 and the second pulser 28 and associated receiver 30. As a result, depending upon which pulser/receiver is operative the gate will couple the appropriately gated video signal from the respective receiver into the vertical deflection amplifier 42. The gated signal is then amplified and applied to the vertical deflection plates of the cathode ray tube.

A blanking gate 52 may be coupled to the cathode ray tube 34 for blanking out the electron beam. The gate 52 is disposed in a blanking mode in synchronism with the undesired portions of the gated video signal and in its unblanking mode in synchronism with the desired portions of the gated video signal from the receivers.

It is thus seen that a visual display may be created on the face of the cathode ray tube 34. The display is a composite of preselected portions of the gated video signal and includes a horizontal trace with one or more vertical marks spaced therealong. These marks correspond to the driving signal originally applied to the search unit 10 and composites of the signals produced by the multiple transducers of the search unit in response to any returning ultrasonic echoes.

The horizontal displacement of the marks along the trace corresponds to the time of reception and therefore is a function of the range or distance of the reflecting target. The amount of the vertical deflection or vertical height of the mark is a function of the magnitude of the echo and is therefore a function of the size of the target, i.e. deflector discontinuity.

In order to transmit and receive the ultrasonic energy at the multiple frequencies (in this instance two different frequencies are employed), the search unit 10 includes a pair of electro-acoustic transducers 60 and 62. In order to provide optimum ultrasonic detection at the two different frequencies, the piezoelectric crystals forming the heart of the transducers must have different thicknesses. Moreover, the tranducers must be physically, electrically and acoustically isolated from each other to eliminate or minimize electrical and acoustical cross talk between the separate frequency channels.

Figure 2:
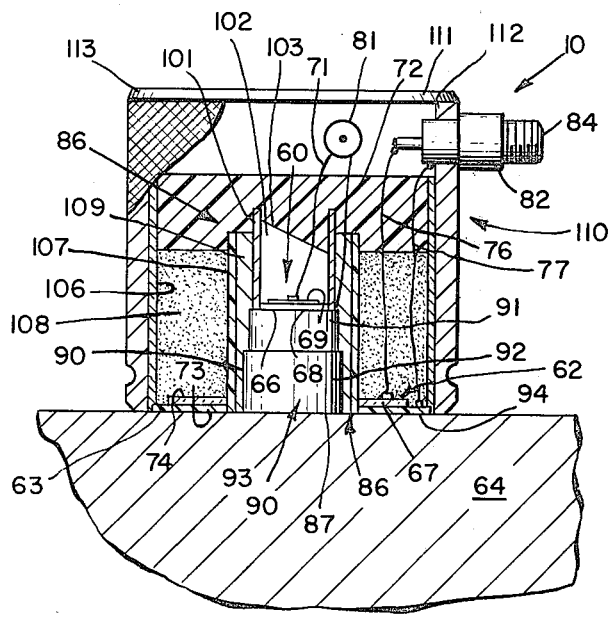
FIG. 2 is a cross-sectional view of the search unit of FIG. 1 embodying one form of the invention suitable for contact type testing.
Figure 3:
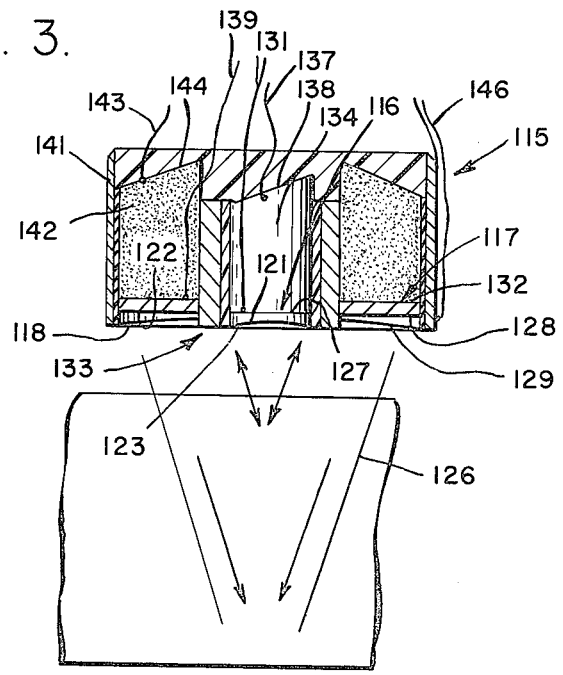
FIG. 3 is a cross-sectional view similar to FIG. 2 but showing another form of search unit suitable for immersion type testing.

The two transducer search unit 10 as illustrated in FIG. 2 has been found to be particularly advantageous for contact type scanning tests. In this type of test, a forward working portion 63 of the search unit is placed in contact with a workpiece 64. A liquid couplant (not shown) may be provided on the surface of workpiece 64 to effectively acoustically couple ultrasonic energy between the transducers of search unit 10 and the interior of the workpiece material.

To effectively permit scanning of the same localized workpiece area simultaneously by both transducers, search unit 10 is here constructed with an inner disc-shaped piezoelectric element 66 for transducer 60. This inner element is coaxially positioned with respect to an outer annular piezoelectric element 67 forming transducer 62. Typically, elements 60 and 67 are either quartz or ceramic piezoelectric crystals. They generally have a substantially uniform thickness and define opposed parallel faces constituting the major surface areas of the element.

In this instance, inner transducer 60 is intended for relatively high frequency ultrasonic testing for discontinuities at the surface of or within the near surface zone of the workpiece. Because of this, piezoelectric element 66 may be the thinnest element of the pair of transducers and thus capable of sustaining natural resonant vibrations of a higher frequency. Conversely, the outer annular element 67 may be of a different and in this instance greater thickness to provide optimum performance at a relatively lower frequency. The relatively lower frequencies are more effective at greater depths within workpiece 64. Thus, transducer 62 is most adapt at locating and measuring discontinuities deeper within the material, i.e. beyond the near surface zone.

The particular frequencies are not critical and will depend on the application. In this instance and as an example only, the inner transducer operates at 10 megahz while the outer transducer operates at 5 megahz.

As mentioned, element 66 is provided with front and rear faces 68 and 69, respectively. Electrode means are affixed to each of these faces for transmitting driving pulses to the transducer and/or receiving transduced electrical signals therefrom. A pair of lead-in wires 71 and 72 are provided for connection to the electrode means on the opposite faces of the element.

Similarly, the outer annular transducer element 67 defines front and rear faces 73 and 74, respectively, for receiving the opposing electrode means. Lead-in conductors 76 and 77 pass the electrical signals to and from the electodes of this outer transducer. The electrodes for each of the piezoelectric elements are not separately shown as the construction and operation thereof are well-known to those skilled in the art. Briefly, the electrodes may be provided by a very thin film of metal plated or vacuum deposited on to the respective faces 68, 69, 73 and 74 of the separate crystals. The various lead-in wires and conductors 71, 72, 76 and 77 are separately, electrically connected to each of these metallic electrode films.

The corresponding front faces 68 and 73 of the different transducers are oriented toward the front working portion 63 of search unit 10. In this manner the ultrasonic energy transmitted from or received by the transducers is in the direction of the intended object, namely workpiece 64.

Separate coaxial connectors 81 and 82 are carried by search unit 10 for connection to the inner transducer lead-in wires 71 and 72 and the outer transducer conductors 76 and 77, respectively. In this manner separate coaxial cables 83 and 84 may be employed to ensure the above-mentioned electrical isolation of the two transducer channels.

Moreover, the separate transducers 60 and 62 are acoustically isolated from each other by an acoustical insulating structure 86 disposed coaxially between the transducer devices. To ensure the effectiveness of structure 86, a radial separation may be provided between the outer circumference of the inner transducer assembly and the inner circumference 87 of the outer transducer. Interposed within this radial spacing is the structure 86 formed of materials more fully described herein to minimize acoustical cross talk. More particularly, the positioning of structure 86 minimizes if not eliminates the propagation of acoustical energy in the radial direction between the transducers. It is desirable that most of the acoustical energy propagate axially toward or away from the front faces 68 and 73 of the transducer elements. On the other hand, acoustical insulating structure 86 functions as a shield against propagation of any radially directed components of this ultrasonic energy.

To further enhance the overall performance of search unit 10, one or both transducer 60 and 62 may be provided with an acoustical transmitting means coupled to the front faces 68 and 73 of the transducer elements respectively. The transmitting means associated with one or both of the transducers may include means for differentially acoustically modifying the transfer of ultrasonic energy between the workpiece and the respective transducer. This means for modifying the ultrasonic energy transfer is preferably tailored to the particular frequency at which the associated transducer is intended to operate.

More particularly, in the search unit 10 of FIG. 2, the inner transducer 60 is intended to operate at relatively high frequencies for detection of discontinuities at or close to the workpiece surface. To enhance its operation, the aforementioned transmitting means is provided in the form of an acoustical delay structure 90. Delay structure 90 is disposed in axial registration with transducer 60 between the front face thereof and the forward working portion 63 of the search unit.

Positioned in this manner, acoustical energy transmitted to and from search unit 60 is delayed by the intervening structure 90. Thus, the acoustical energy transfer is differentially modified, i.e. delayed, relative to the transfer of ultrasonic energy to and from the outer, lower frequency transducer 62. Thus, delay structure 90 not only transmits the ultrasonic energy to and from transducer 60 but also differentially modifies such transfer of ultrasonic energy relative to the transfer associated with transducer 62.

By introducing a time delay in the transmission of ultrasonic waves propagating between transducer 60 and the workpiece, the resolution of defects at or near the workpiece surface is markedly enhanced. The reason for this lies in the response of transducer 60 to one of the driving pulses generated by pulser 24. Immediately in response to such a driving pulse, transducer 60 will transmit a corresponding ultrasonic wave from its front face 68 toward the workpiece. This driving pulse is necessarily passed to the input of receiver 26 whereafter the signal may be displayed on oscilloscope 32 as a timing marker or it may be gated or blanked so as not to appear on the oscilloscope display.

In either event, receiver 26 and the display system is unable to properly respond to and resolve any other signals appearing during or closely after the driving pulse. For example, a reflected ultrasonic wave returned to search unit 60 shortly after the initial transmission would be obscured by the driving signal or at least blanked from the display oscilloscope 32. The driving signal is generally of a much greater amplitude than any of the received echo signals. Thus any of the latter signals which closely follow on the heels of the former are not capable of being resolved. The initial excitation of the transducer by pulser 24 is sometimes referred to as the "main bang" or "big bang".

The delay structure 90 serves to permit the big bang associated with inner transducer 60 to dissipate before echoes are returned from the surface or near surface regions of the workpiece 64. In particular, the time required for the ultrasonic energy to be transmitted from front face 68 of transducer 60 to the surface of workpiece 64 and return therefrom to transducer 60 provides the desired recovery interval.

Thus by disposing transducer 60 at a greater distance from the forward working portion 63 of search unit 10 and interposing the delay structure 90 while maintaining transducer 62 close to the workpiece surface results in a superior multifrequency search unit. Transducer 62 which is searching for defects at a greater depth within workpiece 64 and does not have the main bang problem, is disposed close to the workpiece surface. The proximity of transducer 62 to the workpiece minimizes signal loss due to attenuation of the sound waves as they propagate deep into the material.

The acoustical transmitting means provided by delay structure 90 may be constructed in a number of different ways. For example, the acoustical delay medium may be provided by such materials as Lucite, plexiglass, polyesters, polystyrene, alumina, and others. In this instance, a solid cylindrical member 90 having different diameter sections 91 and 92 and formed of a suitable delay material is positioned in axial alignment with transducer 60 as illustrated. Member 90 occupies substantially all of the axial spacing between transducer 60 and the forward working portion 63 of search unit 10. Preferably there should be no airspace between a front face 93 of member 90 and transducer 60, otherwise acoustical losses become excessive. To avoid losses due to divergence of the acoustical beam, the sections 91 and 92 have increasing diameters with increasing distance from transducer 60 as shown.

In this instance, a transmitting means is also provided in association with the outer annular transducer 62. In particular, an annular wear plate or facing member 94 is mounted concentrically with member 67 and in abutment with the front face 73 thereof. As search unit 10 is a contact scanner, wear plate 94 protects element 67 and its front electrode on face 73 from abrasion and yet permits ready transmission of the ultrasonic energy to and from transducer 62.

Search unit 10 may be constructed in the following manner. First, inner transducer 60 and the associated parts may be assembled. This is done by positioning transducer 60 with its electrodes attached thereto at one end of a hollow cylindrical inner transducer housing 101. Transducer 60 may be secured to the housing 101 by epoxy or other suitable means. A backing or dampening structure 102 may be cast adjacent the rear face 69 of transducer 60 as illustrated and if desired provided with a sloping or tapered rear face 103. Dampening structure 102 and the tapered rear face 103 serve to absorb and dissipate ultrasonic energy transmitted or reflected rearwardly of transducer 60 and away from workpiece 64. A number of different types of materials may be used for structure 102. For example, a hard, rigid dampening material may be used as disclosed in U.S. Pat. No. 2,972,068. Alternatively, a soft and more resilient and deformable dampening material may be used.

After completing these components, housing 101 and transducer 60 secured therein may be bonded such as by epoxy to members 91 and 92 forming delay structure 90. The inside and/or outside of housing 101 may be provided with a conductive coating, such as silver paint or the like for electrical shielding.

Transducer 62 and its associated wear plate 94 may be secured to one axial open end of a hollow cylindrical outer transducer housing 106 as illustrated. As in the case of housing 101, one or both of the cylindrical surfaces of housing 106 may be provided with a metallic coating, such as by silver paint, for electrical shielding.

An intermediate retaining shell 107 of generally hollow cylindrical shape may be provided coaxially between outer and inner housings 106 and 101. Furthermore, retaining shell 107 may be nested at a forward axial end inside the inner circumference 87 of transducer 62 and wear plate 94 as illustrated. Shell 107 and housings 101 and 106 may be provided by any number of suitable materials. For example, a phenollic base material has been found suitable for these components.

To the rear of outer transducer 62, a backing or dampening structure 108 may be cast, in a manner similar to that described for structure 103. Although the rear surface of structure 108 is not tapered in the embodiment of FIG. 2, it may be sloped or tapered in a manner similar to surface 103 of structure 102. The casting of material forming structure 108 fills the radial space between housing 106 and shell 107 as shown. This leaves the interior of shell 107 free to receive the inner transducer subassembly previously completed as described above.

Accordingly, housing 101 together with the inner transducer 60, backing structure 102 and delay structure 90 is inserted through one of the open ends of shell 107 and aligned with the axis coaxial with the surrounding structures.

To secure the inner transducer subassembly and moreover to complete the acoustical isolation structure 86, a cast sound absorbent material may be employed. In this instance, a cast material 109 is used having characteristics similar to or the same as the backing or dampening material used for structures 108 and 103. A variety of materials may be employed for this purpose, the specific material is not believed to be critical. As one example, a polyurethane resin which is characteristically soft, somewhat resilient and deformable may be used. One commercial source for such material is Scotchcast polyurethane resin No. 221 sold by Minnesota Mining and Manufacturing Company.

It is observed that the acoustical isolating structure 86 provided by cast material 109 is substantially coextensive with the axial extent of the inner transducer assembly including delay structure 90 and dampening structure 103. This ensures the acoustical separation or isolation between the different frequency transducers.

Following the foregoing operations, the entire subassembly including housing 106 may be mounted coaxially within an exterior housing 110 which forms the exterior of search unit 10 and carries coaxial connectors 81 and 82 as shown. The lead-in wires or conductors 71, 72, 76 and 77 may now be electrically secured to the appropriate conductors of connectors 81 and 84 to complete the electrical assembly operations. Finally, the remaining interior of exterior housing 110 may be potted by an epoxy potting compound or other suitable potting material 111 through an upper opening 112 of the housing. Thereafter, a top plate 113 may be fastened to the housing to cover and complete the search unit 10.

While search unit 10 is intended for contact scanning, other ultrasonic testing procedures are preferably carried out by immersion testing. In such case, an immersible search unit 115 embodying the principles of the present invention may be employed. In accordance with this type of ultrasonic testing, a liquid bath of water for example is provided with the workpiece and search unit immersed therein. The water serves as an acoustical medium for coupling the ultrasonic energy to and from the workpiece and transducers.

Because the search unit transducer is typically positioned at a distance from the immersed test piece, the problem of obscuring reflections from the surface or near surface regions of the workpiece by the main bang is not normally encountered. The intervening liquid couplant serves as a delay for timed spacing of the return ultrasonic echoes from the workpiece surface, allowing the effects from the main bang to dissipate.

Accordingly, the immersible search unit 115 does not provide the delay structure in association with the inner transducer 116. On the other hand, both the inner disc-like transducer 116 and the coaxially surrounding outer annular transducer 117 may be disposed at different distances from the front working surface or portion 118 of the unit.

Furthermore, the immersion type search unit 115 may provide acoustical transmitting means at the front faces 121 and 122 of the inner and outer transducers, respectively, which modify the transmission of ultrasonic energy by focusing it relative to the workpiece. Immersion testing lends itself to focused ultrasonic energy beams in that the intervening water between the search unit and workpiece provides a field in which the ultrasonic energy may be convergent or divergent.

In this instance, the inner transducer 116 is intended for higher frequency, near surface inspection of the workpiece as in the case of transducer 60 of search unit 10. In this instance, however, the transmitting and modifying means associated with the inner transducer is in the form of an acoustical lens structure 123 coupled to the front face 121 of the transducer. Lens structure 123 may be contoured, and in this instance is concave contoured on a front face 124 thereof for focusing a transmitted ultrasonic wave at or near a surface of workpiece 126. The rear surface 127 of structure 123 is planar so as to mate with the planar front face 121 of the transducer affording complete ultrasonic coupling thereto.

The transmitting and modifying means associated with the lower frequency outer annular transducer 117 similarly includes an acoustical lens structure 128. Structure 128 is however formed to focus the ultrasonic energy at greater depths within workpiece 126, and more particularly beyond the near surface zone covered by transducer 116 and lens structure 123.

Accordingly, structure 128 has a concave contoured surface 129 having a greater acoustical focal length as illustrated. The contoured surface 129 is only interrupted by the central opening accommodating inner transducer 116 and its associated components.

As in the case of search unit 10, the piezoelectric element 131 of transducer 116 has a relatively lesser thickness to accommodate the higher frequencies of vibration necessary for near surface workpiece inspection. Conversely, the annular piezoelectric crystal or element 132 of transducer 117 has a greater thickness for optimum operation at the more penetrating lower ultrasonic frequencies.

Again, it is necessary to acoustically isolate the two different transducers. For this purpose, an acoustical isolating structure 133 may be coaxially mounted in a radial interspace between the inner and outer transducer assemblies. This acoustical shield may be formed in a manner similar to structure 86 of search unit 10.

In constructing the immersible search unit 115, the inner transducer assembly may be constructed by mounting the transducer 116, lens structure 123 and a backing or dampening structure 134 coaxially within an inner housing 136 of hollow cylindrical configuration. Dampening structure 134 is in this instance of a metallic conductive composition and is used to form the rear electrode for transducer 116. As such, the lead-in wire 137 for the rear electrode is merely electrically connected to a rear tapered surface 138 of structure 134 as illustrated. The lead-in conductor for the front face 121 of transducer 116 is provided by a metallic ribbon 139. Ribbon 139 extends along the exterior of housing 136 to a forward end thereof where it is connected to the front face electrode provided between lens structure 123 and element 131.

The outer transducer assembly is mounted inside an outer housing 141 again of hollow cylindrical configuration. Annular transducer 117 and its associated lens structure 128 may be secured to a forward or front open end of housing 141 as shown by a suitable adhesive such as an epoxy adhesive. The annular dampening structure 142 is also secured inside of housing 141 as illustrated. As in the case of structure 134, dampening structure 142 may be of a conductive metallic composition and used to form the rear electrode for transducer element 132. In such case, the rear electrode lead-in wire 143 may be electrically connected as shown to a rear tapered surface 144 of structure 142.

Having completed the inner and outer transducer subassemblies, the inner transducer subassembly may be coaxially nested inside the outer transducer subassembly and the radial free space therebetween cast with sound absorbent material. Suitable materials which may be cast in this manner are described above in connection with dampening structure 86 of search unit 10. The cast material which thus forms the acoustical shield between the inner and outer transducers also physically secures the inner transducer subassembly in place.

Outer housing 141 may be mounted within an exterior housing such as housing 110 shown for search unit 10 or in a different housing as desired. As the search unit is immersed in a liquid bath, it may be desirable to employ a watertight exterior housing for search unit 115. In any event, such a housing may include the coaxial connectors such as connectors 81 and 82 of FIG. 2 for connecting the lead-in wires and conductors 137, 139, 143 and 146 to the instrumentation shown in FIG. 1.

Although the transducers for search unit 10 and search unit 115 will vary depending upon the desired testing frequencies, in the illustrated embodiments, the various transducers have been selected for the following frequencies. For immersible search unit 115, the inner and outer transducers were constructed to operate at 15 megahz and 2.25 megahz, respectively.

Although perferred results have been obtained with the coaxial type inner and outer transducer search units shown in FIGS. 2 and 3, FIGS. 4 and 5 illustrate an alternative side-by-side transducer arrangement. In this case and as thus shown in FIG. 5, a multi-transducer (in this instance two) search unit 150 is provided for immersion testing.

A first relatively higher frequency transducer 151 is mounted near a front open end 152 and to one side of a generally cylindrical hollow housing 153. To the other side of the housing 153, a second and relatively lower frequency transducer 154 is mounted.

One or both of the transducers may be provided with acoustical transmitting and modifying means at the forward working portion 156 of the search unit. In this instance, the relatively higher frequency transducer 151 is provided with an acoustical lens structure 157 which is convex contoured in a manner similar to lens structure 123 of search unit 115 as described above. Thus, lens structure 157 serves to focus or concentrate the ultrasonic energy at or near the surface of the workpiece.

An acoustical shield or isolating structure 158 is provided to preclude acoustical cross talk between the transducers. In this instance, structure 158 may be provided by wall partitions 159 and 160 formed of a sound absorbent material.

Both the high and low frequency transducers may be provided with backing or dampening structures 161 and 162, cast in the manner described for the dampening structures of search unit 10 shown in FIG. 2. Two pairs of lead-in wires 163, 164 and 165, 166 are also provided. The entire assembly may be mounted if desired in an exterior housing, such as housing 110 shown for unit 10 in FIG. 2.

Figure 4:
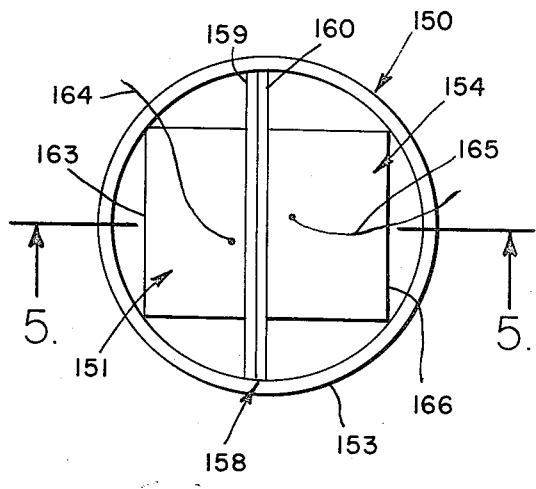
FIG. 4 is a top plan view of still another form of the invention suitable for immersion testing.
Figure 5:
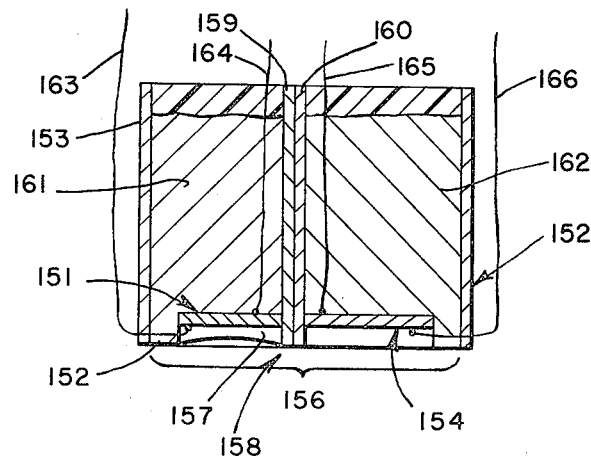
FIG. 5 is a sectional view taken generally along section lines 5—5 of FIG. 4.

While the operation of this side-by-side transducer format has been found acceptable, the embodiment in FIGS. 4 and 5 does not always provide the degree of resolution capable of a search unit having coaxial symmetry as in the case of search units 10 and 115 described above. Nevertheless, there are applications suited to both the coaxial type multitransducer search units of FIGS. 2 and 3 and the side-by-side type of search unit shown in FIGS. 4 and 5.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description thereof are for illustrative purposes only and do not in anyway limit the invention which is defined only by the following claims.

Having thus described the invention what is claimed is:

1. In a nondestructive testing system for inspecting a workpiece with a dual transducer search unit in which a first frequency electrical channel is connected to one of the search unit transducers and a second frequency electrical channel is connected to the other search unit transducer for respective transmission and/or reception of ultrasonic energy at different frequencies, said search unit including:

an inner transducer having a piezoelectric disc element with front and rear faces and electrode means affixed thereto;

an outer transducer having an annular piezoelectric element with front and rear faces mounted coaxially with respect to said inner transducer disc element and having electrode means affixed thereto;

an acoustical insulating structure disposed coaxially between said inner and outer transducers to minimize the transfer of acoustical energy radially between said transducers; and inner and outer acoustical transmitting means coupled to the front faces of said transducer elements for transmitting ultrasonic energy between said transducers and a forward working portion of said search unit, at least one of said inner and outer transmitting means including acoustical modifying means for differentially modifying acoustical waves associated with one of said transducers relative to the other transducer, whereby optimum transfer of ultrasonic energy to and from the workpiece may be achieved in accordance with the different frequencies associated with the inner and outer transducers.

2. In the nondestructive testing system of claim 1 wherein said first frequency electrical channel is of a relatively high frequency and is connected to said inner transducer to test for discontinuities at the surface and in the near surface zone of the workpiece while the second frequency electrical channel is connected to said outer transducer and is of a relatively low frequency to test for discontinuities beyond the near surface zone of the workpiece, and said inner acoustical transmitting means including a delay medium as said modifying means for differentially delaying ultrasonic waves associated with said inner transducer relative to waves associated with said outer transducer, whereby a built-in time delay is provided between the pulsing of said inner transducer and the reception thereby of reflected ultrasonic energy from the surface and near surface zone of the workpiece.

3. In the nondestructive testing system of claim 1, the first frequency electrical channel providing a relatively higher frequency and being connected to said inner transducer for resolving discontinuities located at the surface and within the near surface zone of a workpiece, the second frequency electrical channel being of a relatively lower frequency and connected to said outer transducer for resolving discontinuities beyond the near surface zone of the workpiece, and said inner and outer acoustical transmitting means including acoustical focusing lenses for focusing ultrasonic energy associated with said inner transducer at the surface and near surface zone of a workpiece and for focusing ultrasonic energy associated with said outer transducer at a region beyond the near surface zone of such workpiece.

4. In the nondestructive testing system of claim 1 wherein said search unit is adapted to test workpieces while immersed therewith in a liquid bath, and said inner and outer transmitting means associated with said inner and outer transducers respectively include curvilinear focusing structures providing said modifying means in which ultrasonic energy transmitted to and from said inner and outer transducers is differentially focused to different depths of the workpiece.

5. In the nondestructive testing system of claim 1, said inner and outer transducers being radially spaced apart, and said acoustical insulating structure including a sound absorbent material disposed in the radial space between said transducers.

6. In the testing system of claim 5, said inner and outer transducers including acoustical dampening structures affixed to the rear faces thereof and extending rearwardly thereof, said sound absorbent material defining a generally hollow cylindrical structure extending coaxially between and axially coextensive with said dampening structures.

7. In the nondestructive testing system of claim 5, said search unit including inner and outer dampening structures affixed to the rear faces of said inner and outer transducers for dissipating ultrasonic energy transmitted rearwardly of said transducers, at least one of said dampening structures including a sloping rear surface remote from the rear face of the associated transducer to enhance the dissipation of rearwardly transmitted ultrasonic energy, and said acoustical insulating structure further defined by said sound absorbent material being cast to form a generally hollow cylindrical structure substantially axially coextensive with said dampening structures.

8. In the nondestructive testing system of claim 1, said piezoelectric elements of said inner and outer transducers selected to have different thicknesses according to the different frequencies associated therewith and said inner and outer transducers being physically, electrically and acoustically isolated from each other.

9. In the nondestructive testing system of claim 1, said inner and outer transducers being dimensioned to define a radial space between the outer circumference of said inner transducer and the inner circumference of said outer annular transducer, and said acoustical insulating structure including a cast acoustical shield formed in said radial space.

10. In the nondestructive testing system of claim 1, at least one of said inner and outer acoustical transmitting means including a contoured sound transmitting structure for focusing ultrasonic energy to and from the associated transducer at a selected depth zone of the workpiece.

11. An ultrasonic nondestructive search unit for inspecting a workpiece in a system having a first frequency electrical channel and a second frequency electrical channel, said search unit including:

an inner transducer having a piezoelectric disc element with front and rear faces and electrode means affixed thereto, said electrode means being adapted to be connected to said first frequency electrical channel;

an outer transducer having an annular piezoelectric element with front and rear faces mounted coaxially with respect to said inner transducer disc element and having electrode means affixed thereto and being adapted for connection to said second frequency electrical channel;

an acoustical insulating structure disposed coaxially between said inner and outer tranducers to minimize the transfer of acoustical energy therebetween; and inner and outer acoustical transmitting means coupled to the front faces of said transducer elements for optimum transfer of ultrasonic energy between said transducers and a workpiece at the particular frequency associated with each such transducer.

* * * * *